(12) United States Patent
Jang et al.

(10) Patent No.: US 8,519,045 B2
(45) Date of Patent: Aug. 27, 2013

(54) GRAPHENE COMPOSITE NANOFIBER AND PREPARATION METHOD THEREOF

(75) Inventors: Sung-Yeon Jang, Daegu (KR); Ho Seok Park, Daejeon (KR); Seong Mu Jo, Seoul (KR); Dong Young Kim, Seoul (KR); Won Hi Hong, Daejeon (KR); Sang Yup Lee, Daejeon (KR); Tae Jung Park, Daejeon (KR); Bong Gill Choi, Daejeon (KR)

(73) Assignee: Korea Institute of Science and Technology (KR)

( * ) Notice: Subject to any disclaimer, the term of this patent is extended or adjusted under 35 U.S.C. 154(b) by 682 days.

(21) Appl. No.: 12/712,653

(22) Filed: Feb. 25, 2010

(65) Prior Publication Data
US 2010/0317790 A1    Dec. 16, 2010

(30) Foreign Application Priority Data

Mar. 3, 2009    (KR) ................. 10-2009-0018146

(51) Int. Cl.
C08K 3/04    (2006.01)
(52) U.S. Cl.
USPC .......................................... 524/496
(58) Field of Classification Search
USPC .......................................... 524/496
See application file for complete search history.

(56) References Cited

U.S. PATENT DOCUMENTS

2007/0158618 A1* 7/2007 Song et al. ............... 252/500
2010/0029884 A1* 2/2010 Simonson et al. .......... 526/352

FOREIGN PATENT DOCUMENTS
WO    WO 2008/129906    10/2008

OTHER PUBLICATIONS

J. Mack, L. Viculis, A. Ali, R. Luoh, G. Yang, R. Kaner, T. Hahn, and F. Ko, "Graphite Nanoplatelet Based Nanocomposites by the Electrospinning Process." Proc. of the 17$^{th}$ Annual Conf. of the Am. Soc. for Composites, Purdue University, 2003.*
*Electric Field Effect in Atomically Thin Carbon Films*, K.S. Novosclov, et. al., Science, Oct. 22, 2004, vol. 306, pp. 666-669; www.sciencemag.org.
*Electronic Transport Properties of Individual Chemically Reduced Graphene Oxide Sheets*, Klaus Kern, et al., American Chemical Society, Oct. 18, 2007, vol. 7, No. 11, pp. 3499-3503.
*Graphene-Based Composite Materials*, Sasha Stankovich, et al., Nature Publishing Group, Jul. 20, 2006, vol. 442, pp. 282-286.
*Gate-Induced Insulating State in Bilayer Graphene Devices*, Lieven Vandersypen, et al., Nature Publishing Group, Feb. 2008, vol. 7, pp. 151-157.

* cited by examiner

*Primary Examiner* — Ling Choi
*Assistant Examiner* — Lanee Reuther
(74) *Attorney, Agent, or Firm* — Ostrolenk Faber LLP

(57) ABSTRACT

Disclosed are a graphene composite nanofiber and a preparation method thereof. The graphene composite nanofiber is produced by dispersing graphenes to at least one of a surface and inside of a polymer nanofiber or a carbon nanofiber having a diameter of 1~1000 nm, and the graphenes include at least one type of monolayer graphenes, and multilayer graphenes having a thickness of 10 nm or less. The graphene composite nanofiber can be applied to various industrial fields, e.g., a light emitting display, a micro resonator, a transistor, a sensor, a transparent electrode, a fuel cell, a solar cell, a secondary cell, and a composite material, owing to a unique structure and property of graphene.

3 Claims, 6 Drawing Sheets

GRAPHENE COMPOSITE NANOFIBER AND PREPARATION METHOD THEREOF

CROSS-REFERENCE TO A RELATED APPLICATION

Pursuant to 35 U.S.C. §119(a), this application claims the benefit of earlier filing date and right of priority to Korean Application 10-2009-0018146, filed on Mar. 3, 2009, the content of which is incorporated by reference herein in its entirety.

BACKGROUND OF THE INVENTION

1. Field of the Invention

The present invention relates to a graphene composite nanofiber, and particularly, to a graphene composite nanofiber including monolayer graphenes and multilayer graphenes having a thickness of 10 nm or less, and having a nanoscale fibrous shape, and a preparation method thereof.

2. Background of the Invention

Graphene is a monolayer of graphite, and is a sheet of carbon atoms bound together with double electron bonds (called as an $sp^2$ bond) in a thin film only one atom thick. Atoms in graphene are arranged in a honeycomb-style lattice pattern. This graphene is a very thin single flat sheet having a thickness of about 0.3 nm, and is a two-dimensional (2D) material for carbon. This graphene was firstly discovered by Andre Geim and Kostya Novoselov at Manchester University in England in 2004 (Novoselov, K. S. et al., Science, 2004, 306, 666-669). According to the American Physical Society (APS) and the English Nature Nanotechnology, this graphene is being spotlighted as one of the most remarkable new materials which can change the future information technology.

Differently from other carbon allotropes (e.g., carbon nanotube, graphite), the graphene is a semiconductor material having an energy gap of '0'. The graphene has characteristics such as high electron mobility, a quantum-hole characteristic (electrons inside graphenes behave like relativistic particles having no rest mass, with a speed of about 1,000,000 m/s), a low specific resistance, high to mechanical strength, and a wire surface area. Furthermore, the graphene is much more advantageous than carbon nanotubes due to low costs in an economic aspect.

However, in the aspect of application fields, the graphenes have a difficulty in being processed and treated like other carbon allotropes. Each layer of graphite (i.e., each graphene layer) is stacked to each other due to Van der Waal's force (5.9 kJ/mol carbon), thereby not implementing a physical property of a graphene monolayer. Since the first discovery of the graphenes, research has been mainly executed with respect to a method for preparing graphenes from graphite and dispersing the graphenes (Novoselov, K. S. et al., Science 2004, 306, 666-669), an analysis of various characteristics of graphenes (Kern, K. et al., Nano Lett. 2007, 7, 3499-3503), a method for preparing a graphene composite material (Stankovich, S. et al., Nature 2006, 442, 282-286), application fields to a transistor or a sensor (Vandersypen, K. et al., Nature Mater. 2008, 7, 151-157). Among the above research, the research about a graphene composite material has been actively executed based on suspension and dispersion of a graphene monolayer into a polymer matrix. And, research about a method for forming a graphene composite having a nanoscale one-dimensional structure has never been executed.

SUMMARY OF THE INVENTION

Therefore, a first object of the present invention is to provide a graphene composite in the form of a nanoscale one-dimensional structure, the graphene composite in which graphene monolayers (hereinafter, will be also referred to as "monolayer graphenes") and/or graphene multilayers (hereinafter, will be also referred to as "multilayer graphenes") having a thickness of 10 nm or less are well-dispersed.

A second object of the present invention is to provide a method for orienting (aligning) the monolayer graphenes and/or multilayer graphenes in a specific direction in the form of the one-dimensional structure.

A third object of the present invention is to provide a carbon nanofiber including the monolayer graphenes and/or multilayer graphenes.

To achieve these and other advantages and in accordance with the purpose of the present invention, as embodied and broadly described herein, there is provided a graphene composite nanofiber produced by dispersing graphenes to at least one of a surface and inside of a polymer nanofiber or a carbon nanofiber having a diameter of 1~1000 nm, wherein the graphenes comprise at least one type of monolayer graphenes, and multilayer graphenes having a thickness of 10 nm or less.

To achieve these and other advantages and in accordance with the purpose of the present invention, as embodied and broadly described herein, there is also provided a method for preparing a graphene composite nanofiber, the method comprising: preparing a spinning solution in which polymers are dissolved and graphenes are dispersed, wherein the graphenes comprise at least one type of monolayer graphenes, and multilayer graphenes having a thickness of 10 nm or less; and spinning the spinning solution in the form of fibers in an electric field thereby preparing a graphene composite nanofiber where the polymers and the graphenes are combined with each other.

The present invention may have the following effects.

Firstly, may be produced a graphene composite nanofiber produced by dispersing monolayer graphenes, and/or multilayer graphenes having a thickness of 10 nm or less, to at least one of a surface and inside of a nanofiber, with an orientation (alignment) parallel to an axis of the nanofiber.

Secondly, owing to a unique property and a one-dimensional nano structure of graphenes, the graphene composite nanofiber may have a very excellent mechanical and/or electric characteristic. Accordingly, the graphene composite nanofiber may be applied to various industrial fields, e.g., a light emitting display, a micro resonator, a transistor, a sensor, a transparent electrode, a fuel cell, a solar cell, a secondary cell, and a composite material.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
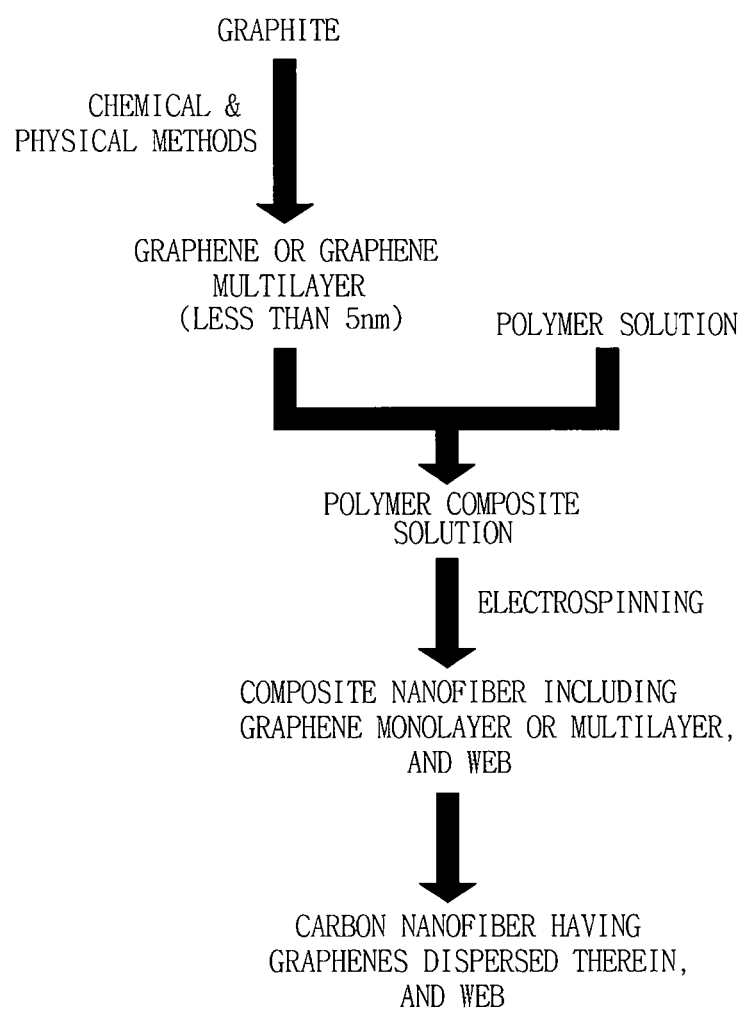
FIG. 1 is a schematic view showing a method for preparing a graphene composite nanofiber according to the present invention.

Description will now be given in detail of the present invention, with reference to the accompanying drawings.

In the present invention, "monolayer graphenes" signifies a planar monolayer of graphite (0001), and "multilayer graphenes" signifies a stacked structure of the "monolayer graphenes" having several to several tens of layers.

The multilayer graphenes have a thickness thicker than that of the monolayer graphenes, and less than 10 nm (about less than 20 layers), preferably, to less than 5 nm (about less than 10 layers).

The graphene composite nanofiber according to the present invention is characterized in that graphenes are dispersed to a surface and/or inside of a nanofiber. Here, the nanofiber has a diameter of 1~1000 nm, preferably 10~500 nm, more preferably 100~200 nm. The nanofiber may be a polymer nanofiber formed of polymers, or a carbon nanofiber prepared by carbonizing the polymer nanofiber. The graphenes include at least one type of monolayer graphenes, and multilayer graphenes having a thickness of 10 nm or less. When the multilayer graphenes have a thickness more than 10 nm, they are present in the form of a graphite plate implemented as the graphenes are bonded to each other. As a result, mechanical and electric characteristics of the graphenes can not be prepared. For instance, when the multilayer graphenes have a thickness more than 10 nm, charge mobility is significantly degraded when being applied to a semiconductor device. Furthermore, mechanical strength due to complexity with other materials is significantly degraded.

In order to produce desired mechanical and electric characteristics of the graphenes, the graphenes are preferably oriented (aligned) parallel to an axis of the nanofiber. The reason is as follows. When the graphenes are oriented parallel to an axis of the nanofiber, an electric characteristic of the graphenes is implemented along the orientation direction, and mechanical strength in the orientation direction is significantly increased.

When the multilayer graphenes have a thickness more than 10 nm, it is difficult to implement the orientation characteristic.

The graphenes dispersed in the nanofiber may be graphene oxides in an oxidized state, or may be graphenes produced by reducing (deoxidizing) the graphene oxides. As explained later, a graphene oxide solution in an oxidized state is prepared so as to implement dispersability of graphenes inside a solvent. By mixing the graphene oxides with polymers and spinning the mixture, may be produced a graphene composite nanofiber that graphene oxides are dispersed to a nanofiber. This graphene composite nanofiber has an excellent mechanical characteristic, but has a degraded electric characteristic since it is present in the form of graphene oxides. Therefore, when an excellent electric characteristic is required, applied is an additional process for reducing the graphene oxides after the spinning process.

A method for preparing a graphene composite nanofiber according to the present invention largely comprises preparing a spinning solution (1), and preparing a graphene composite nanofiber (2).

The method may further comprise carbonizing the graphene composite nanofiber produced through the step (2), so as to produce a carbon fiber including graphenes. In this case, the method may further comprise performing an insolubilization process in air before carbonizing the graphene composite nanofiber. Hereinafter, each step will be explained in more detail. FIG. 1 is a schematic view showing a method for preparing a graphene composite nanofiber according to the present invention.

Preparation of Spinning Solution

Firstly, prepared is a spinning solution in which polymers are dissolved and graphenes are dispersed. The graphenes include at least one type of monolayer graphenes, and multilayer graphenes having a thickness of 10 nm or less.

A spinning solution may be prepared by the following three methods.

Firstly, prepared is a graphene solution that the graphenes are dispersed in a solvent, and then polymers are dissolved in the graphene solution, thereby producing a spinning solution. Secondly, additionally prepared is a polymer solution in which polymers are dissolved, and then the polymer solution is mixed with the graphene solution, thereby producing a spinning solution. Thirdly, graphenes are put in the polymer solution thus to be dispersed, thereby producing a spinning solution. Among these three methods, the first method is preferable for dispersability of graphenes and accuracy of concentration control. More concretely, in case of dispersing about 1 wt % of graphenes by concentration based on polymers and dispersing at least 10 wt % of polymers, if an additionally prepared polymer solution is mixed with the graphene solution (i.e., graphene oxide solution) by the second method, it is difficult to increase a concentration of the polymers due to limitations of solubility of the graphene oxide solution. For instance, in case of putting about 1 wt % of graphenes to 10 wt % of polymers, if 9 mL of water is put, about 1 g of the polymers and about 0.01 g of the graphenes have to be used. In this case, solubility of the graphene oxide solution nearly reaches a limitation value, ca. 1 mg/ml. Therefore, it is preferable to firstly disperse graphenes in water, and then to disperse polymers therein by the first method.

The graphene solution may be prepared by the following three methods. Generally, graphenes are easily bonded to each other, whereas graphene oxides are well-dispersed in a solvent. Therefore, prepared is a graphene oxide solution in an oxide state. In the present invention, the term of "graphene solution" will be also referred to as "graphene oxide solution".

Firstly, the graphene oxide solution may be produced by performing acid treatment and sonication with respect to graphite (chemical method). More concretely, graphite is added to a mixed solution of sulfuric acid and nitric acid. Next, the mixture is sonicated (using a voltage more than 200 W) for one or more hours, thereby producing a dispersed solution. In case of aging the dispersed solution at room temperature for three or more days, it turns purplish brown. Next, the dispersed solution is washed by water, and then multilayer graphenes (having a thickness of about several tens of nm) is filtered, the multilayer graphenes of which interlayer gap has been widened by centrifugation and filtering methods. Next, the multilayer graphenes are oxidized by a strong oxidant, thereby producing multilayer graphenes oxides. These multilayer graphenes oxides undergo heat treatment and sonication, thereby producing monolayer graphenes oxides, or multilayer graphenes oxides having a thickness of 10 nm or less. Next, the oxides undergo centrifugation and filtering processes, thereby producing a graphene oxide solution having a yellowish brown color.

Secondly, graphite is consecutively exfoliated with using a cellophane tape, thereby producing monolayer graphenes, and/or multilayer graphenes having a thickness of 10 nm or less (physical method). Next, these monolayer graphenes, and/or multilayer graphenes are put in a solvent, and undergo acid treatment and sonication, thereby producing a graphene oxide solution.

Thirdly, Si on the surface of SiC is sublimated by an epitaxial growth method through pyrolysis (thermal decomposition) of the SiC under a vacuum atmosphere, thereby producing graphenes produced by carbon atoms remaining on the surface of the SiC. Next, these monolayer graphenes, and/or multilayer graphenes having a thickness of 10 nm or less are put in a solvent, and undergo acid treatment and sonication, thereby producing a graphene oxide solution.

The present invention is not limited to the above three methods. That is, the graphene oxide solution may be produced by various methods rather than the above three methods.

As the polymers of the present invention, may be used all types of polymers that can be dissolved by a solvent, and that can be spun (e.g., electrospun) in an electric field. For instance, the polymers may include poly(vinylidene fluoride), poly(vinylidene fluoride-co-hexafluoropropylene), polyacrylonitrile, poly(acrylonitrile-co-methacrylate), polymethylmethacrylate, polyvinylchloride, poly(vinylidenechloride-co-acrylate), polyethylene, polypropylene, etc. (1), nylon-based polymers such as nylon 12 and nylon-4,6 (2), aramid, polybenzimidazole, polyvinylalcohol, cellulose, cellulose acetate, cellulose acetate butyrate, polyvinyl pyrrolidone-vinyl acetates, poly(bis-(2-(2-methoxy-ethoxy-ethoxy))phosphazene, poly(ethylene imide), poly(ethylene succinate), poly(ethylene sulphide), poly(oxymethylene-oligo-oxyethylene), poly(propylene oxide), poly(vinyl acetate), polyaniline, poly(ethylene terephthalate), poly(hydroxy butyrate), poly(ethylene oxide), SBS copolymer, poly(lactic acid), etc. (3), biopolymer such as polypeptide and protein (4), phenolic resin (5), and pitch-based polymers such as coal-tar pitch and petroleum pitch.

Alternatively, not only the copolymer and blend of the polymers, but also a mixture of emulsion or organic/inorganic powder may be used as the polymers. As the solvent, may be properly used a solvent capable of dissolving a corresponding polymers, and capable of dispersing graphenes according to the polymers.

Preparation of Graphene Composite Nanofiber

Next, the prepared spinning solution is spun in the form of fibers in an electric field, thereby preparing a graphene composite nanofiber in which the polymers and the graphenes are combined with each other.

The spinning method may be an electrospinning method. For instance, the spinning solution in which graphenes are well-dispersed is put in a dosing pump, and an electric field of a high voltage is applied between a spinning nozzle and a collector. As a result, the spinning solution is discharged from the spinning nozzle, and the graphene composite nanofiber is collected on the collector in the form of a web or a non-woven fabric in which graphene composite nanofibers are entangled with each other.

The spinning method may include electro-blown spinning, melt-blown spinning, and flash spinning rather than the electrospinning.

The prepared graphene composite nanofiber is produced by dispersing the graphenes to a nanofiber composed of polymers aligned in an oxide state with a high orientation degree.

In order to orient the polymer composite nanofiber finally produced in the present invention, the spinning may be performed into an electric field formed by two electrodes, or formed inside a drum type of electrode being rapidly rotated. In this case, the formed fiber is oriented to a specific direction by a magnetic field.

The graphenes include at least one type of monolayer graphenes, and multilayer graphenes having a thickness of 10 nm or less. The graphene composite nanofiber has a diameter of 1~1000 nm, preferably 10~500 nm, more preferably 100~200 nm.

In application fields requiring an excellent electric characteristic, further comprised is an additional process for reducing graphene oxides from the graphene composite nanofiber. More concretely, graphene oxides may be reduced from the graphene composite nanofiber by selecting one of the following three methods, or by combing the three methods with each other. The first method is to reduce graphene oxides by exposing the graphene composite nanofiber to a gaseous or liquid chemical drug including a hydrogen oxide (e.g., hydrogen iodide, hydrogen sulfide, aluminum hydride, etc.), a low oxide (an oxide having an oxidation degree than that of a general oxide lower by one degree) (e.g., carbon monoxide, sulfur dioxide, etc.), salt of low oxyacid (e.g., sulfite, sodium sulfide, etc.), metal having large electropositivity, i.e., metal that can easily transit to a positive ion (e.g., alkali metal, magnesium, zinc, etc.), an organic compound having a low oxidation degree (e.g., aldehyde, sugars, formic acid, oxalic acid, etc.). The second method is to reduce graphene oxides by contacting the graphene composite nanofiber to hydrogen by blowing the hydrogen into the graphene composite nanofiber. And, the third method is to reduce graphene oxides by irradiating strong optical energy (light) onto the graphene composite nanofiber.

Thirdly, graphene oxides including reduced graphenes may be reduced from the graphene composite nanofiber by reducing the spinning solution by using the aforementioned chemical drug or by blowing hydrogen before the spinning process, and then by spinning the reduced spinning solution. In order to remove impurities which are present in the spinning solution by the reduction process, the reduced spinning solution may be precipitated by a non-solvent. Then, the precipitated spinning solution may undergo a filtering process and a washing process, thereby removing a residual solvent, a reducing agent, impurities, etc. Next, the spinning solution may undergo a drying process thus to produce high purity powder where graphenes and polymers are mixed to each other. Then, the high purity powder is re-dispersed to a solvent by sonication, a stirring process, heat treatment, etc. And, this reduced spinning solution may be spun.

Preparation of Carbon Nanofiber Including Graphenes

The present invention may further comprise carbonizing the prepared graphene composite nanofiber.

The carbonization process may be performed under an inactive atmosphere (e.g., nitrogen atmosphere) at 500~3000° C. Through this carbonization process, polymers of a nanofiber is carbonized to form a carbon nanofiber. Accordingly, can be produced a graphene composite nanofiber produced by dispersing graphenes to at least one of a surface and inside of the carbon nanofiber with a high orientation degree.

Before the carbonization process, the present invention may further comprise a crosslinking process (insolubilization process) for preventing the graphene composite nanofiber produced by the spinning process from being melted or thermally decomposed due to the carbonization process.

Figure 2:
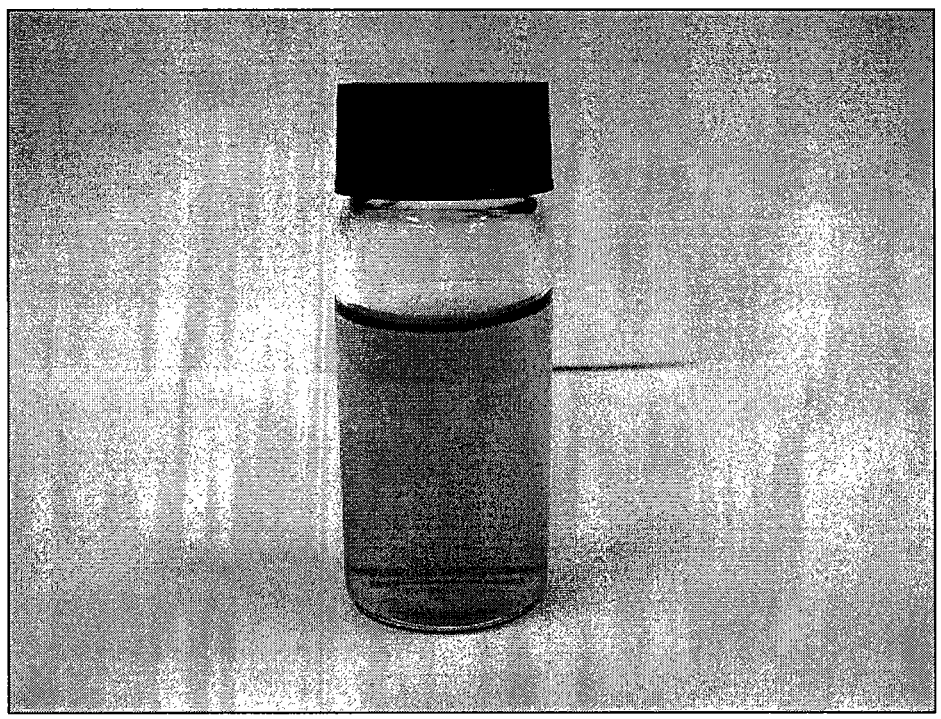
FIG. 2 is an image showing a graphene dispersion solution after seven days, the solution in which monolayer graphenes and multilayer graphenes having a thickness of 10 nm or less are dispersed, each graphenes prepared by a chemical method.
Figure 3:
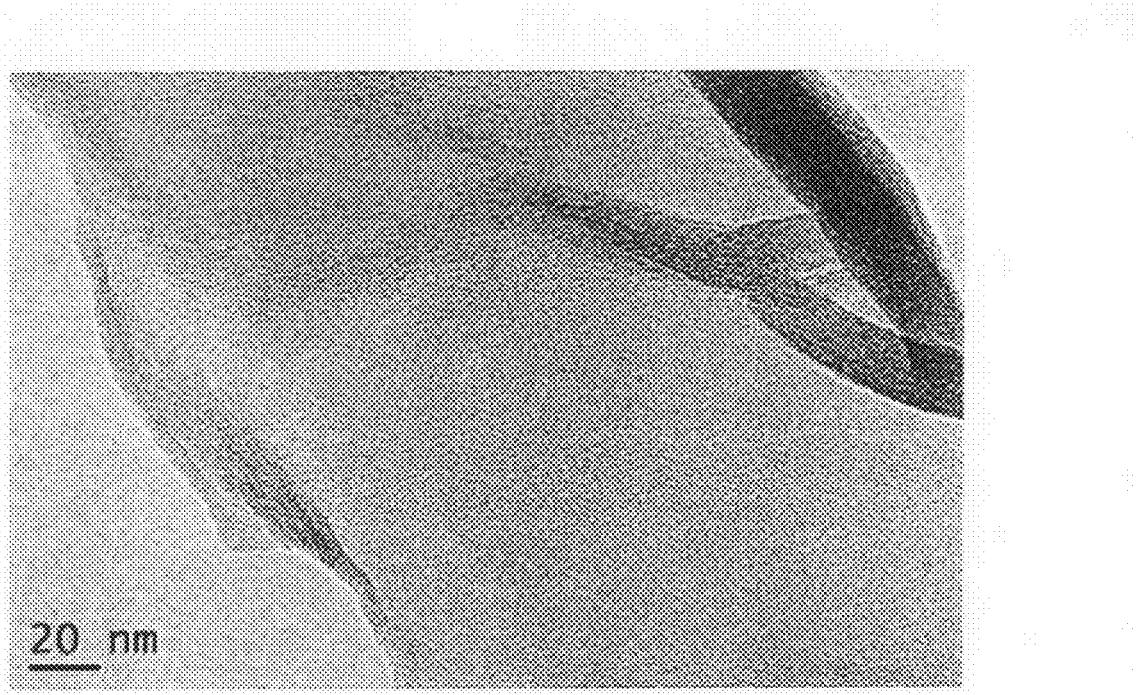
FIG. 3 is a transmission electron microscopy (TEM) image of the graphene dispersion solution of FIG. 2.

First Embodiment 10 g of graphite (Aldrich) was put in a flask containing 7.5 g of $NaNO_3$ (99%). Next, 621 g of $H_2SO_4$ (96%) was slowly added to the mixture, and was cooled. To this mixture, 45 g of $KMnO_4$ was slowly added for 1 h. The mixture was cooled for 2 h, and then was reacted for four days while being slowly stirred at 20° C. Next, a solution having a high viscosity was diluted in 250 mL of exceptionally high purity distilled water with maintaining a temperature below 50° C., and then was stirred for 2 h. To this resultant, added were 700 mL of exceptionally high purity distilled water and 20 mL of $H_2O_2$ (30%), thereby producing a yellow solution with bubbling. Next, this mixed solution was filtered, and metallic impurities were removed by using 1 L of HCL aqueous solution (volume ratio of $HCl:H_2O$ is 1:10). Next, the mixed solution was washed a plurality of times with using exceptionally high purity distilled water, thereby having a neutral pH value. Next, residual metallic ions in the mixed solution were removed by a dialysis process. This prepared 0.1 mg/mL of solution was sonicated (400 W) at room temperature for about 30 minutes, thereby producing a graphene oxide solution as shown in FIG. 2, the graphene oxide solution in which graphene oxides are stably dispersed to water even after one week. As an analysis result of the graphene oxide solution with using a transmission electron microscopy (TEM), as shown in FIG. 3, at least 90% of the graphene oxides were implemented as single layers and exhibited a structure that ending portions thereof are rolled-up. The graphene oxides were put into $H_2O$ solution so that a weight ratio of the graphene oxides with respect to polyvinylalcohol (PVA) could be 0.01-2 wt %. Next, the graphene oxides were re-dispersed to the $H_2O$ solution by sonication, a stirring process, etc. Next, a spinning solution was prepared by controlling a weight ratio of the PVA with respect to the $H_2O$ as 10 wt %.

Figure 4:
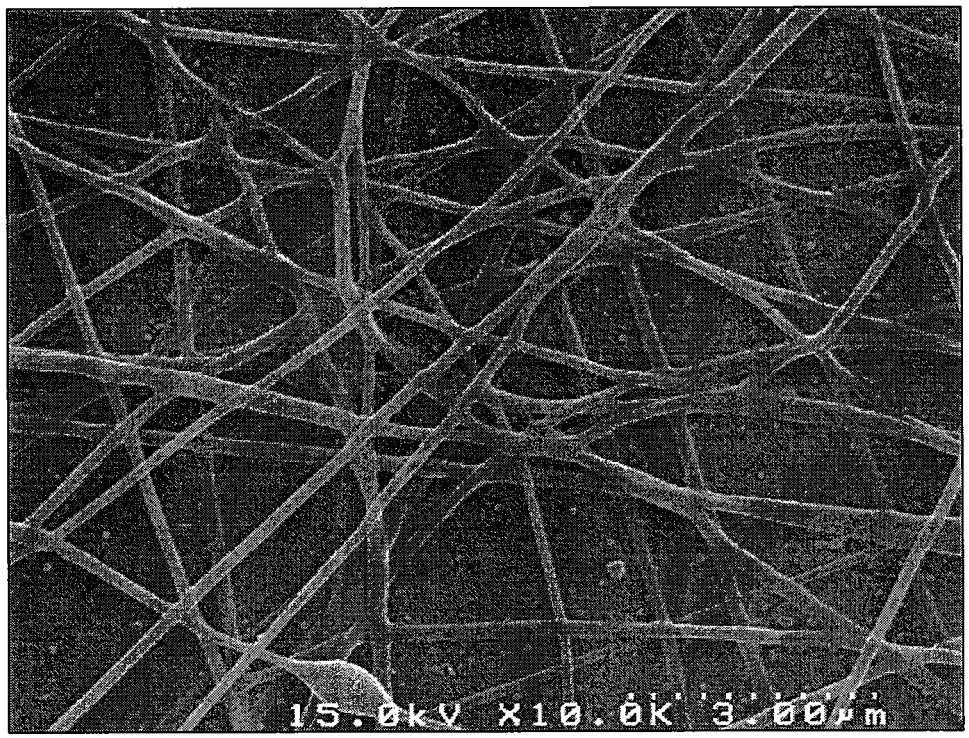
FIG. 4 shows a scanning electron microscopy (SEM) image of a PVA fiber including no graphenes.
Figure 5:
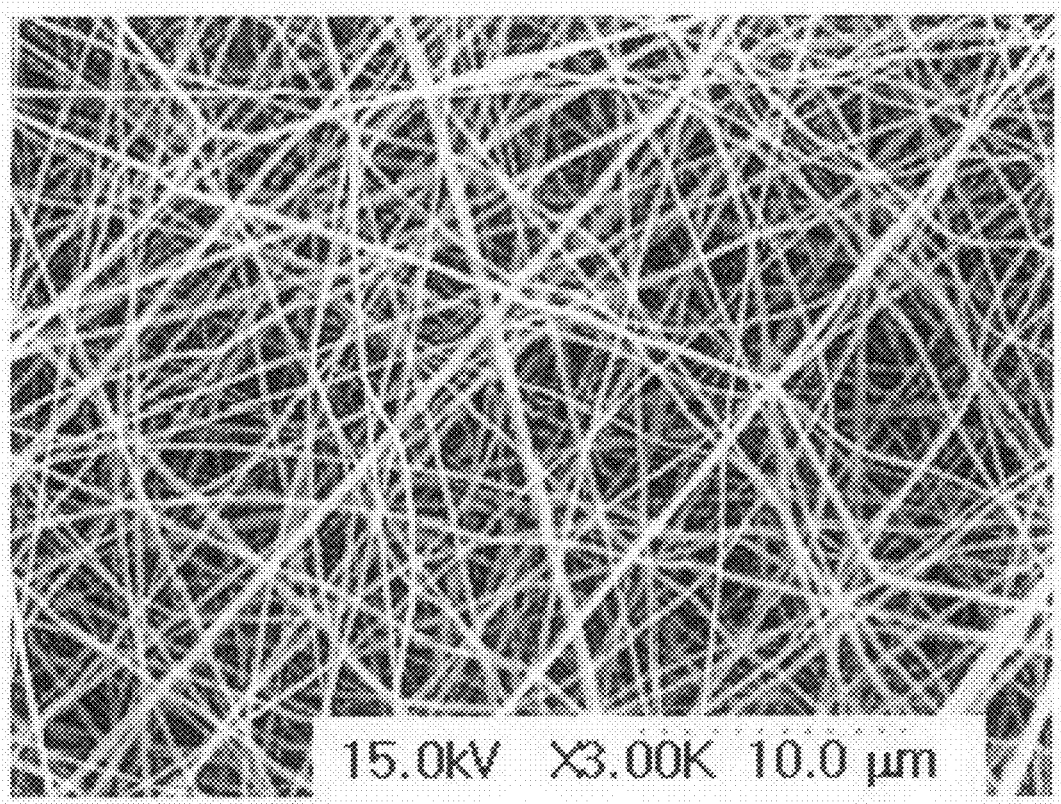
FIG. 5 shows a scanning electron microscopy (SEM) image of a PVA/graphene composite nanofiber prepared according to a first embodiment of the present invention.
Figure 6:
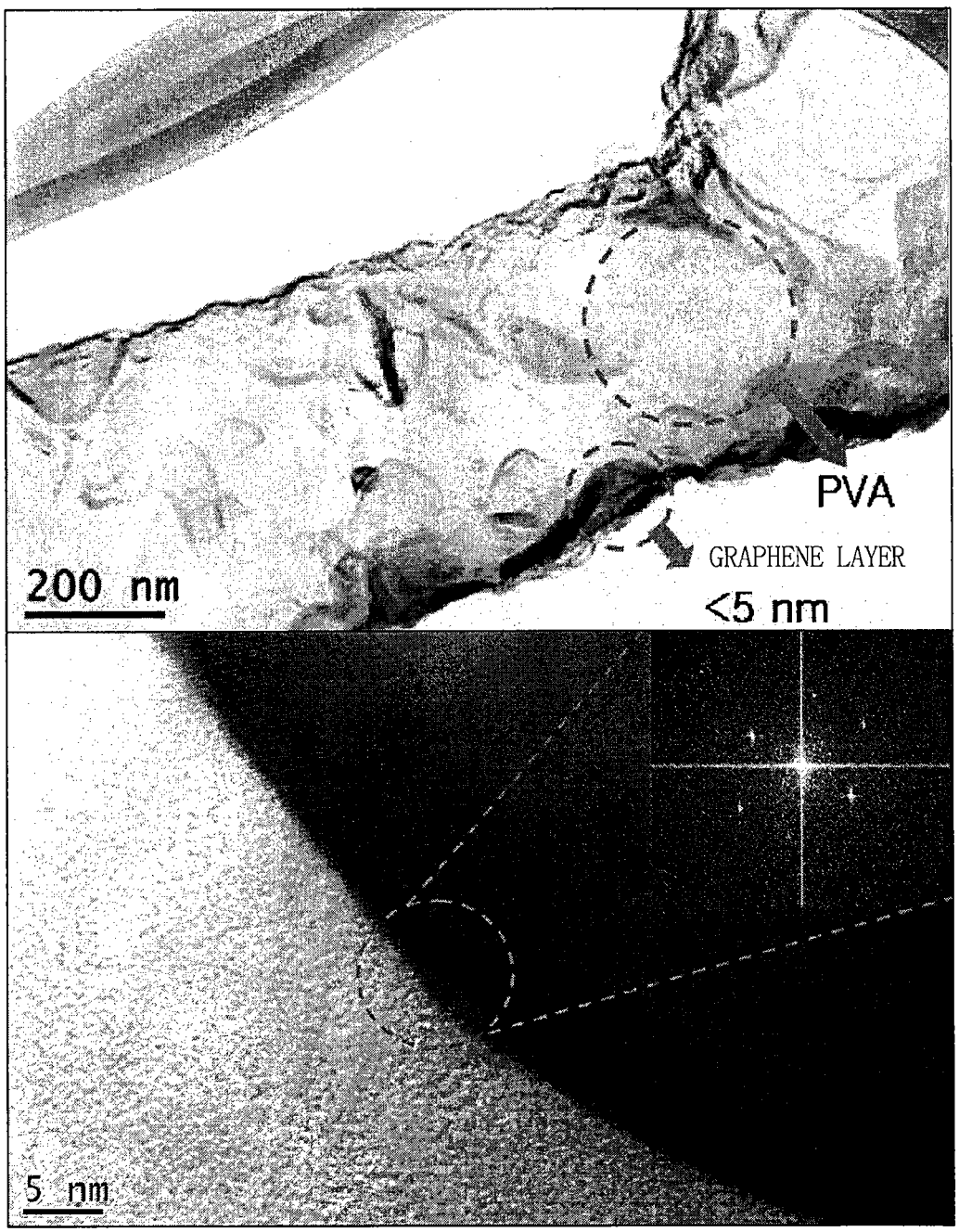
FIG. 6 shows a TEM image of a PVA/graphene composite nanofiber prepared according to a first embodiment of the present invention in a lengthwise direction, and a TEM image indicating a sectional surface of the PVA/graphene composite nanofiber (inset of the lower image indicates a diffraction image of the circle).

This prepared spinning solution was put in a dosing pump, and electro spinning was performed by controlling a voltage of 5~20 kV to be applied, thereby producing a graphene composite nanofiber non-woven fabric. As shown in the SEM image of FIG. 4, the conventional PVA nanofiber exhibited a welding structure on a spun substrate. On the contrary, FIG. 5 exhibited a graphenes/PVA composite nanofiber having a stable fiber structure, and including graphenes having a diameter of about 120~200 nm and having a weight ratio of 0.1 wt %. Referring to FIG. 6, graphenes were oriented, in a position selection manner, with a thickness less than 5 nm (less than about ten layers) towards the surface of the composite nanofiber. From a highly-magnified image and a diffraction image showing a sectional surface of the graphene/PVA composite nanofiber, crystallinity of graphenes located on the surface of the composite nanofiber could be observed.

Second Embodiment

Graphite layers were consecutively exfoliated with using a cellophane tape, thereby producing a multilayer graphenes film having a thickness of 5 nm or less. 0.3 g of the graphite produced in a mechanical manner was added to 20 mL of $H_2SO_4$ (96%) at 0° C. To this mixture, 15 g of $KMnO_4$ was slowly added with maintaining a temperature of 20° C. This mixed solution was stirred for 2 h with maintaining a temperature of 35° C. Next, the mixed solution was diluted in 120 mL of exceptionally high purity distilled water with maintaining a temperature below 50° C., and then was stirred for 2 h. To this resultant, added were 700 mL of exceptionally high purity distilled water and 20 mL of $H_2O_2$ (30%), thereby producing a yellow solution with bubbling. Next, this mixed solution was filtered, and metallic impurities were removed by using 1 L of HCL aqueous solution (volume ratio of $HCl:H_2O$ is 1:10). Next, the mixed solution was washed a plurality of times with using exceptionally high purity distilled water, thereby having a neutral pH value. Next, residual metallic ions in the mixed solution were removed by a dialysis process. Graphenes were put into an N,N-dimethylformamide (DMF) solution so that a weight ratio of the graphenes with respect to Polyacrylonitrile (PAN) could be 0.5~5 wt %. Next, the graphenes were re-dispersed to the DMF solution by sonication, a stirring process, etc. Next, a spinning solution was prepared by controlling a weight ratio of the PAN with respect to the DMF as 5~20 wt %.

This prepared spinning solution was put in a dosing pump, and electro spinning was performed by controlling a voltage of 5~20 kV to be applied, thereby producing a non-woven fabric of a graphenes/PAN composite nanofiber.

Third Embodiment

The graphenes/PAN composite nanofiber prepared according to the second embodiment underwent an insolubilization process in air at 260° C. (during the insolubilization process, polymers are heated, and have a net-shaped three-dimensional structure thus to be cured. Accordingly, in case of forming a carbon fiber, it is more advantageous for a cured resin to undergo a graphitization process). Then, the graphenes/PAN composite nanofiber was carbonized up to 1400° C. under a nitrogen atmosphere, thereby preparing a graphene composite carbon nanofiber.

Comparative Example 10 g of graphite (Aldrich) powder (having a diameter of about 20 μm) was put in an N,N-dimethylformamide (DMF) solution. Next, the graphite powder was dispersed to the DMF solution by sonication, a stirring process, etc. Next, a spinning solution was prepared by controlling a weight ratio of the PAN with respect to the DMF as 0.01~2 wt %, the same ratio as that in the aforementioned First Embodiment.

This prepared spinning solution was put in a dosing pump, and electro spinning was performed by controlling a voltage of 5~20 kV to be applied, thereby producing a graphite/PAN composite nanofiber. Here, partially entangled fibers and graphite lumps were observed.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A graphene composite nanofiber in which graphenes are dispersed to at least one of a surface and inside of a polymer nanofiber or a carbon nanofiber having a diameter of 1~1000 nm,
   wherein the graphenes comprise one selected from monolayer graphenes, multilayer graphenes having a thickness of 10 nm or less, and a combination thereof; wherein
   i) 90% of the graphenes are present as monolayer graphenes;
   ii) the graphenes are graphene oxides or reduced form of the graphene oxides; and
   iii) the composite nanofiber has no entangled fibers or graphite lumps.

2. The graphene composite nanofiber of claim 1, wherein the graphenes are oriented parallel to an axis of the polymer nanofiber or the carbon nanofiber.

3. The graphene composite nanofiber of claim 1, wherein the polymer nanofiber or the carbon nanofiber having the graphenes dispersed therein is produced by electrospinning a solution containing graphenes and polymers.

* * * * *